H. T. DOBBS & E. T. JOHN.
MEANS FOR INDICATING THE DIRECTION OF TRAVEL OF VEHICLES AND VESSELS.
APPLICATION FILED JAN. 12, 1918.

1,290,119.

Patented Jan. 7, 1919.
3 SHEETS—SHEET 1.

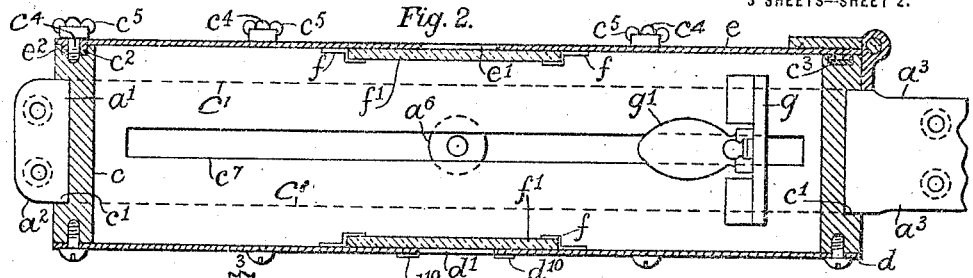
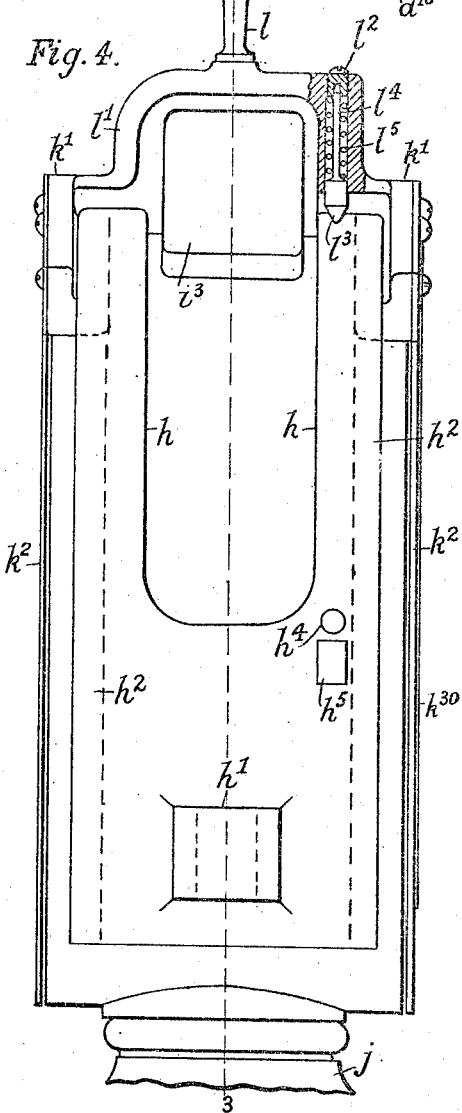
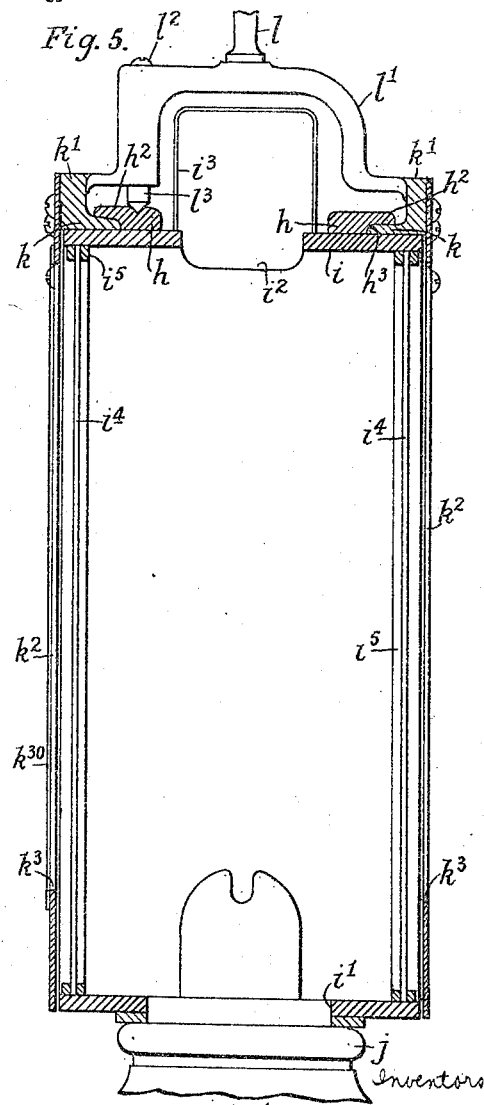

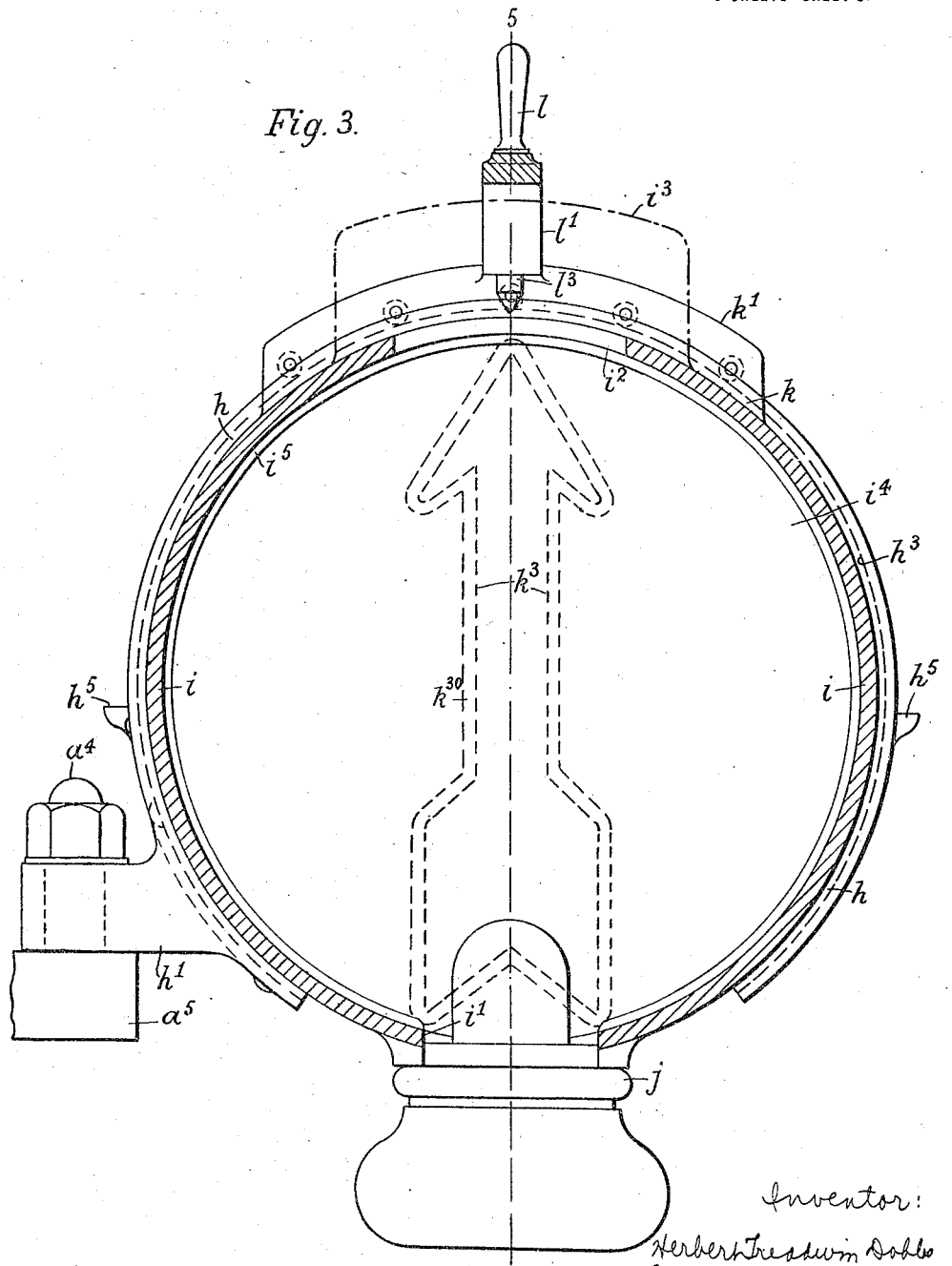

UNITED STATES PATENT OFFICE.

HERBERT T. DOBBS, OF CARDIFF, AND EDMUND T. JOHN, OF SWANSEA, WALES.

MEANS FOR INDICATING THE DIRECTION OF TRAVEL OF VEHICLES AND VESSELS.

1,290,119.     Specification of Letters Patent.     Patented Jan. 7, 1919.

Application filed January 12, 1918. Serial No. 211,698.

*To all whom it may concern:*

Be it known that we, HERBERT TREADWIN DOBBS and EDMUND THOMAS JOHN, subjects of the King of Great Britain, residing, respectively, at Cardiff and Swansea, both in the county of Glamorgan, South Wales, have invented certain new and useful Improvements in Means for Indicating the Direction of Travel of Vehicles and Vessels, of which the following is a specification.

The object of the present invention is to provide simple and improved means for indicating, in front and to the rear of a vehicle or vessel, the direction of travel of the same, so that it may be clearly seen whether it is proposed to keep straight ahead or to turn to one side or to the other side.

According to the present invention we form a cylindrical casing made in two parts, one of which is fixed at the side of the vehicle or vessel, and the other of which rotates about the fixed part. This casing is somewhat flat, and the front and rear faces, which are carried by the movable or rocking part, are made of opaque material or material which has been rendered opaque, and which is cut away like a stencil, or left translucent, to produce on each face any desired indicating device, such as an arrow. The movable part is provided with a handle so that the arrows may be moved to point directly upward or to the right, or to the left. When the arrows are vertical, they indicate that the vehicle or vessel is keeping on a straight course. When they are moved to the right or to the left, they indicate that the vehicle or vessel is about to turn in the direction indicated.

The apparatus is provided with an internal source of light, the rear arrow preferably showing a red light, and the front arrow a white translucent surface. This latter will be readily visible by day if the casing be dark or black, but in order to render the rear arrow visible by day, it is preferably outlined with white paint or the like.

It is preferable to provide the apparatus with means for automatically locking the movable part of the casing with respect to the fixed part to prevent the one part moving with respect to the other due to vibration.

It is advantageous in some circumstances to provide means to enable the casing to be turned through 90° on a vertical axis to the side of a vehicle when this latter is about to pass through a doorway.

It is also advantageous to provide stops to limit the motion of the movable part around the fixed part.

The invention is illustrated in the accompanying drawings, in which:—

Fig. 2 is a section on the line 2—2 of Fig. 1.

Fig. 3 shows a modification and is a vertical section, partly in elevation, taken on the line 3—3 of Fig. 4.

Fig. 4 is a side elevation, and Fig. 5 is a section on the line 5—5 of Fig. 3.

Figure 1:
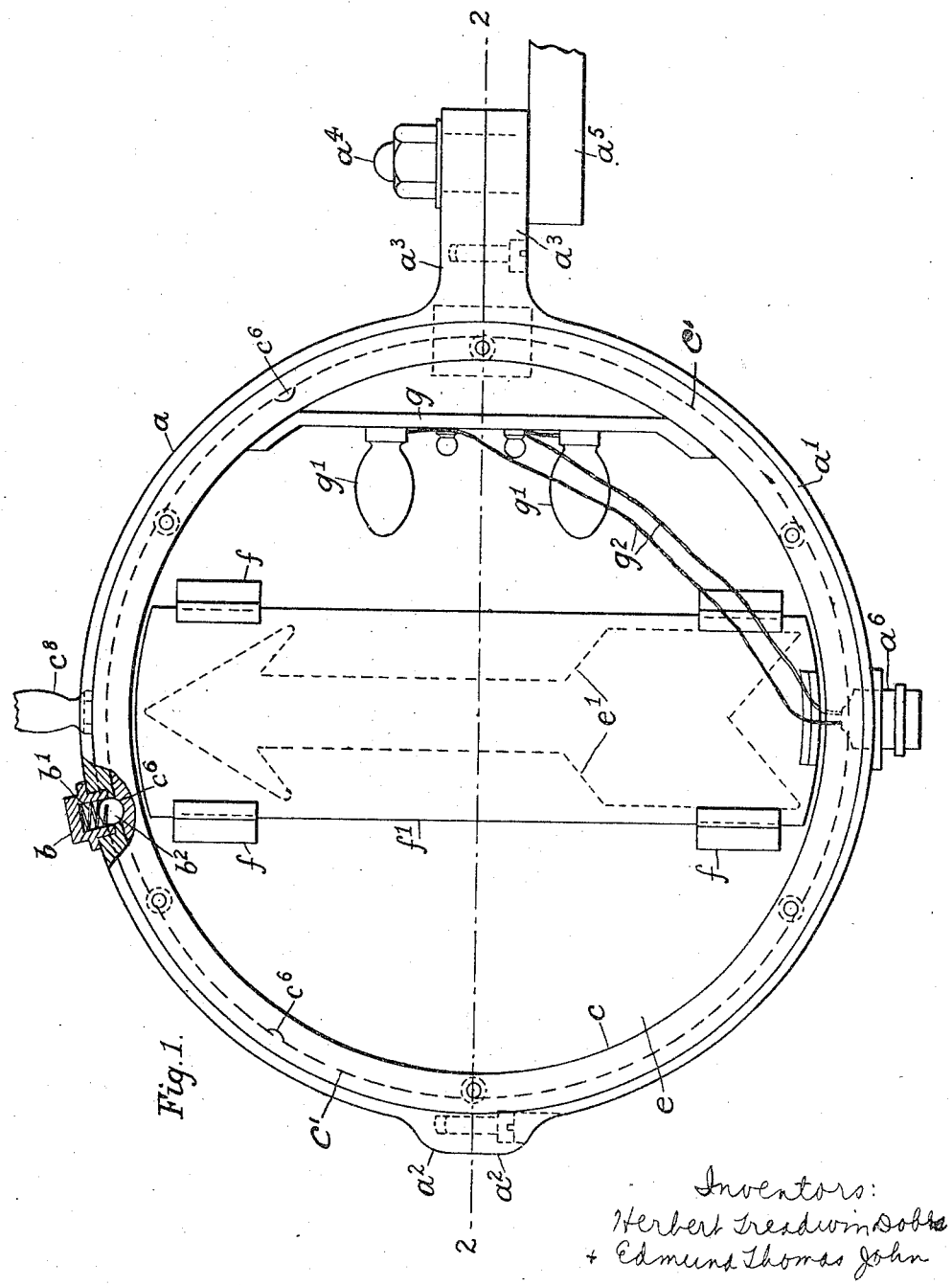
Figure 1 is a front elevation of one form of apparatus, with the front of the casing omitted.

As shown in Figs. 1 and 2, the fixed part of the casing consists of a ring made in two parts, $a$, $a^1$, having on opposite sides corresponding lugs $a^2$ and $a^3$, which are screwed together. The lugs $a^3$ are bored and pivoted by the bolt $a^4$ to the bracket $a^5$, which is fixed to the vehicle or vessel. The fixed ring $a$, $a^1$, carries an adapter or connection $a^6$ for electric light wires and an automatic spring locking device consisting of a cap $b$, a spring $b^1$ located within the cap $b$, and a locking piece in the form of a ball $b^2$ pressed radially inward by the spring $b^1$. The ring $a$, $a^1$, is formed to receive the cap $b$ and to allow the ball $b^2$ to project therefrom. This ball $b^2$ enters shallow recesses $c^6$ in the moving part of the casing, which consists of a sleeve $c$ having a groove $c^1$ to receive the fixed ring $a$, $a^1$. The recesses $c^6$ are formed in the bottom of the groove $c^1$. To one side of the sleeve $c$ is fixed by means of screws the disk $d$ of opaque material, which is cut away at $d^1$ in the form of an indicator such as an arrow outlined with white paint $d^{10}$. To the other side of the sleeve $c$ is hinged another disk $e$ of opaque material, which is also cut away at $e^1$ in the form of an indicator such as an arrow. The disks $d$ and $e$ are each provided with clips $f$, and strips of translucent material $f^1$, the rear one preferably red and the front one preferably white in the case of a road vehicle. On board ship the one rear light may be green to indicate the starboard side. The disk $e$ is shown with a rib $e^2$ entering a groove $c^2$ in one face of the sleeve $c$, which groove may contain a rubber ring $c^3$. Screw threaded studs $c^4$ may be fixed in the groove $c^2$, and wing-nuts $c^5$ may be employed to keep the disk $e$ closed against the sleeve $c$. The sleeve $c$ carries a plate $g$ provided with electric lamps $g^1$, which are connected by the wires $g^2$ to the adapter $a^6$. The wires $g^2$ are sufficiently long to allow the sleeve $c$ to be moved. The sleeve $c$ is slotted at $c^7$ to allow the wires $g^2$ to pass therethrough and to receive the point of the adapter $a^6$. A handle $c^8$ fixed to the sleeve $c$ allows this latter to be readily rotated or rocked with respect to the fixed ring $a$, $a^1$, and the lugs $a^2$, $a^3$, form stops to limit the motion of the handle $c^8$.

The form of apparatus shown in Figs. 3, 4 and 5 is adapted to be illuminated by means of an oil lamp. In this construction the fixed part consists of a pair of arc shaped carriers $h$, $h$, connected together in parallel planes and by the lug $h^1$, which is bored and pivoted by the bolt $a^4$ to the bracket $a^5$ in a similar manner to that shown in Fig. 2. The carriers $h$, $h$, are provided with outwardly extending flanges $h^2$. To the arc shaped carriers $h$, $h$, is fixed the horizontally disposed cylindrical part $i$. The flanges $h^2$ and the cylindrical part $i$ form grooves $h^3$ to receive a portion of the moving portion of the casing. The cylindrical part $i$ is formed with an aperture $i^1$ at its lowest part to receive the oil lamp $j$, and it is formed with an upper aperture $i^2$ to allow the products of combustion to escape. Over the aperture $i^2$ is fixed a ventilating hood $i^3$. The cylindrical part $i$ carries sheets $i^4$ of translucent material which are fixed thereto by means of rings $i^5$ in any usual manner, one sheet being preferably red and the other white, as above described. In this construction shown in Figs. 3, 4 and 5, the moving part of the casing consists of two segmental members $k$, having flanges $k^1$, which are connected together by the legs $l^1$ of the handle $l$. The segmental members $k$ are located in the grooves $h^3$ of the fixed part and slide therein. To each segmental flange $k^1$, is fixed an indicator disk $k^2$, which is cut away at $k^3$ in the form of an arrow outlined with white paint $k^{30}$. One of the legs $l^1$ of the handle $l$, has a hole therethrough which is closed at its upper end by a cap $l^2$. In the lower part of the said hole is located a locking piece $l^3$, having a guiding spindle $l^4$, which passes up and at its upper end enters the cap $l^2$. Around the spindle $l^4$ is a coiled spring $l^5$, which, acting between the cap $l^2$ and plunger $l^3$, acts to press this latter radially inward so that it may enter shallow recesses $h^4$ in one of the carriers $h$ and thereby lock the indicator disks in the desired position. Suitable stops $h^5$, $h^5$, are formed on the carriers $h$, $h$, to limit the motion of the inner end of the plunger $l$ and consequently of the indicator disks $k^2$. The stops $h^5$ are so arranged that the plunger $l^3$ is arrested in position to enter one of the shallow recesses $h^4$.

What we claim as our invention is:—

1. An indicator for signaling the direction of travel of a moving object, having a cylindrical casing consisting of a fixed part connected to the moving object and a movable part adapted to fit and slide around the fixed part, opaque plates carried by the front and back of the moving part and having a part in each in the form of an indicator allowing light to pass therethrough, translucent material behind each opaque plate, a handle connected to the moving part, and a source of light within the casing.

2. An indicator for signaling the direction of travel of a moving object, having a cylindrical casing consisting of a fixed part connected to the moving object and a movable part adapted to fit and slide around the fixed part, opaque plates carried by the front and back of the moving part and having a part in each in the form of an indicator allowing light to pass therethrough, translucent material behind each opaque plate, a handle connected to the moving part, a source of light within the casing, and stops carried by the fixed part to limit the motion of the moving part.

3. An indicator for signaling the direction of travel of a moving object, having a cylindrical casing consisting of a fixed part connected to the moving object and a movable part adapted to fit and slide around the fixed part, opaque plates carried by the front and back of the moving part and having a part in each in the form of an indicator to allow light to pass therethrough, translucent material behind each opaque plate, a handle connected to the moving part, a source of light within the casing, a spring-pressed locking piece carried by one part, and shallow recesses in the other part into which the spring-pressed locking piece enters.

4. An indicator for signaling the direction of travel of a moving object, having a cylindrical casing consisting of a ring made in two parts and corresponding lugs on the said parts by which they are connected, a bolt passing through two of the lugs and forming a pivot, a bracket to which said pivot is fixed, a moving sleeve having a groove around its exterior to receive the said ring, a handle fixed to said moving sleeve, indicator plates carried by the front and back of the moving sleeve and having parts on both plates through which light may pass, clips carried by said indicator plates, and translucent material held by said clips.

5. An indicator for signaling the direction of travel of a moving object, having a cylindrical casing consisting of a ring made in two parts and corresponding lugs on the said parts by which they are connected, a bolt passing through two of the lugs and forming a pivot, a bracket to which said pivot is fixed, a moving sleeve having a groove around its exterior to receive the said ring, a handle fixed to said moving sleeve, indicator plates carried by the front and back of the moving sleeve and having translucent parts in both plates through which light may pass, clips carried by said indicator plates, translucent material held by said clips, an adapter carried by the said ring, wires connected to said adapter and passing through a slot in the moving sleeve, and electric lamps carried by the moving sleeve and connected to the said wires.

6. An indicator for signaling the direction of travel of a moving object, having a cylindrical casing consisting of a ring made in two parts and corresponding lugs on the said parts by which they are connected, a cap carried by said ring, a spring located within the cap, a locking piece pressed radially inward by said spring and projecting through an aperture in the said ring, a bolt passing through two of the lugs and forming a pivot, a bracket to which said pivot is fixed, a moving sleeve having a groove around its exterior to receive the said ring and recesses to receive the said locking piece, a handle fixed to said moving sleeve, indicator plates carried by the front and back of the moving sleeve and having parts in both plates through which light may pass, clips carried by said indicator plates, and translucent material held by said clips.

7. An indicator for signaling the direction of travel of a moving object, having a cylindrical casing consisting of a ring made in two parts and corresponding lugs on the said parts by which they are connected, a bolt passing through two of the lugs and forming a pivot, a bracket to which said pivot is fixed, a moving sleeve having a groove around its exterior to receive the said ring, a handle fixed to said moving sleeve, an indicator plate rigidly fixed to one side of the moving sleeve, another indicator plate hinged to the other side of said moving sleeve, the said indicator plates each having a part allowing light to pass therethrough, clips carried by said indicator plates, and translucent material held by said clips.

In testimony whereof we affix our signatures.

HERBERT T. DOBBS.
EDMUND T. JOHN.